United States Patent [19]
Thompson

[11] Patent Number: 4,494,213
[45] Date of Patent: Jan. 15, 1985

[54] DEDICATED CORRELATOR

[75] Inventor: William L. Thompson, Chardon, Ohio

[73] Assignee: The Babcock & Wilcox Company, New Orleans, La.

[21] Appl. No.: 387,642

[22] Filed: Jun. 11, 1982

[51] Int. Cl.³ .................. G06G 7/19; G01F 1/66; G01J 1/00
[52] U.S. Cl. .................. 364/604; 73/861.06; 364/510; 364/819
[58] Field of Search ............ 364/510, 604, 728, 819, 364/824; 73/861.06

[56] References Cited

U.S. PATENT DOCUMENTS

| | | | |
|---|---|---|---|
| 3,595,078 | 7/1971 | Beck et al. | 364/728 |
| 3,660,647 | 5/1972 | Pryor, Jr. | 364/728 |
| 3,777,133 | 12/1973 | Beck et al. | 364/728 |
| 3,819,919 | 6/1974 | McGunigle | 364/565 X |
| 4,041,293 | 8/1977 | Kihlberg | 364/819 X |
| 4,248,085 | 2/1981 | Coulthard | 73/861.06 |
| 4,430,772 | 2/1984 | Massen et al. | 364/728 |

Primary Examiner—Felix D. Gruber
Attorney, Agent, or Firm—Vytas R. Matas; Robert J. Edwards

[57] ABSTRACT

A dedicated correlator receives two noise signals from spaced centers sensing noise in a fluid flow. One of the noise signals in delayed by a variable known amount with respect to the other. The amount of correlation between the delayed and undelayed signal is determined. A sweep voltage generator is connected for variably increasing or decreasing the delay at set rates. A peak lock control is connected to the sweep generator and to the apparatus for establishing correlation for changing the direction of the sweep generator when it is determined that the amount of correlation is decreasing from a maximum. The particular delay amount corresponding to maximum correlation corresponds, in turn, to the amount of time required for the fluid to traverse the two sensors and, thus, the velocity of the fluid. The particular delay amount varies with variations in fluid velocity since the peak lock control follows these variations and controls the sweep voltage generator accordingly.

12 Claims, 7 Drawing Figures

DEDICATED CORRELATOR

FIELD AND BACKGROUND OF THE INVENTION

The present invention relates, in general, to flow meters and, in particular, to a new and useful dedicated correlator which operates to establish maximum correlation between a delayed and undelayed signal supplied from two spaced apart sensors which sense noise signals coming from a fluid flow.

The use of correlation techniques for establishing fluid flow and other operator parameters is disclosed in U.S. Pat. No. 4,019,038 to Critten et al. According to that disclosure, an ultrasonic signal is passed through a flow of fluid at two spaced locations along the flow direction. The amount of correlation between these two signals where one signal is delayed with respect to the other in circuitry, is determined and is used as a measure of the time required by the fluid to traverse the two sensors.

In addition to the additional requirements of providing an ultrasonic signal at each sensor sight, the circuitry described in Critten et al is quite complex.

General purpose signal correlators such as the so-called SAICOR instrument, have been used for extracting flow signals using correlation techniques. These are laboratory instruments, however, and are quite expensive. They must be shared between several flow meters in a large installation to be economically feasible.

SUMMARY OF THE INVENTION

The present invention is designed for flowmeter application and is inexpensive enough for individual flowmeter applications. Many of the features available with the more expensive unit are unnecessary in a flow meter application and therefore are not included in the invention. This unit determines the maximum of the correlation function and locks on to it rather than calculating the entire function and displaying it.

While the preferred embodiment disclosed below is primarily drawn to a flowmeter application, it is noted that this invention is equally applicable to all time-dependent variable applications such as auto or cross correlation, and not strictly to the measurement of flow.

According to the invention, the natural noise occurring in a fluid flow or other phenomenon to be measured is utilized as a noise signal. Such noise signals may, for example, be the electrostatic charge pattern in a flow of pulverized coal or the signal received from a combination light-photocell sensor which generates a signal corresponding to variations in the reflection of light against a flow of pulp for the manufacture of paper.

Accordingly, an object of the present invention is to provide a correlator for establishing correlation of two noise signals having positive and negative polarity components comprising, an input polarity comparator for each signal, for generating a pulse wave for each signal having a high level upon the occurrence of one of the positive and negative polarity components and a low level upon the occurrence of the other, variable delay means connected to one of the pulse waves for delaying that pulse wave by a particular and variable delay amount, wave correlation means for comparing the delayed and undelayed waves and establishing a correlation signal which is high with good correlation and low with poor correlation between the delayed and undelayed signals, sweep means for varying the delay amount of the variable delay means in an increasing and a decreasing direction, peak lock control means connected to the sweep means and to the correlation means for determining when the correlation signal is decreasing and upon the determination of such decreasing correlation signal controlling the sweep means to change its direction so that a particular delay amount which corresponds to a maximum correlation signal is established, and scaling means connected to the peak lock means for converting the particular delay amount to a readable signal, which signal in the case of a flow meter corresponds to the velocity of flow of a fluid past spaced sensors which generate the two noise signals.

A further object of the invention is to provide a correlator which is sufficiently simple and inexpensive to be dedicated to a single flow meter or other measuring device.

A further object of the invention is to provide a dedicated correlator which is simple in design, rugged in construction and economical to manufacture.

For an understanding of the principles of the invention, reference is made to the following description of a typical embodiment thereof as illustrated in the accompanying drawings.

DESCRIPTION OF THE PREFERRED EMBODIMENT

Figure 1:
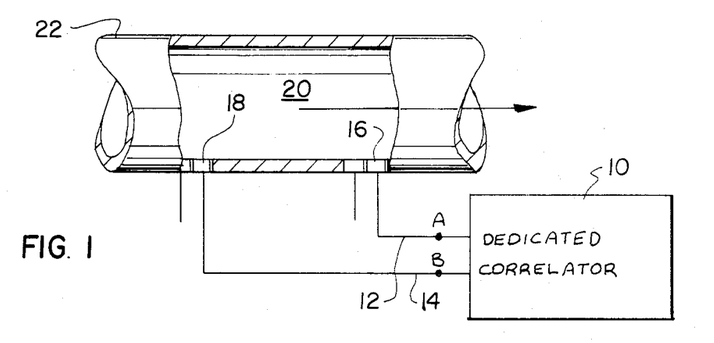
FIG. 1 is a schematic representation of a dedicated correlator according to the invention used as a flowmeter.

Referring to the drawings, in particular, the invention embodied therein, in FIG. 1, comprises a dedicated correlator generally designated 10 which receives two signals over lines 12 and 14 from spaced-apart sensors 16, 18. Sensors 16, 18 sense noise generated by a flow of fluid 20 within a conduit 22. Sensors 16 and 18 may, for example, be of the type to sense electrostatic charge patterns in the flow 20. This is particularly useful when the flow is that of pulverized coal. When the flow is of pulp, in the manufacture of paper, for example, sensors 16, 18 may include a source of light in a photodetector. The signal produced by the two photodetectors varies with the varying amount of light reflected off the pulp flow.

Figure 2:
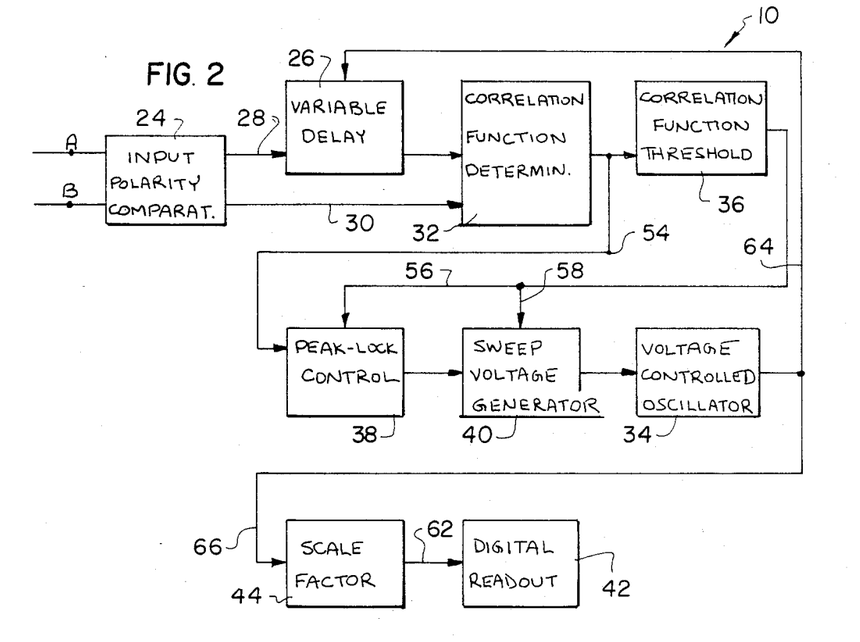
FIG. 2 is a block diagram illustrating the dedicated correlator of the invention.

As shown in FIG. 2, an input polarity comparator 24 receives the input signal A and B from sensors 16 and 18. Each of the input signals includes positive and negative polarity components. The input polarity comparator converts the input noise signals into square waves which correspond to the polarity of the two noise signals. The comparator operates on each signal to give a high level when the input is above zero (or positive polarity) or a low level when the input is below zero (or negative polarity). In this way, two pulse waves are generated, one for each input noise signal, with only the polarity of the signal being utilized and the amplitude being ignored.

A pulse wave from noise signal A is applied to a variable delay 26 over line 28 and the pulse wave for noise signal B is applied over line 30 directly to a correlation function determination unit 32.

Variable delay functions to delay the pulse wave by a variable but determined delay amount. The variable delay includes a 256 bit digital shift register which is used to provide 256 units of delay for the signal entering the variable delay 26. A clocking function for the shift register is varied by an VCO (voltage controlled oscillator) 34 connected to the variable delay 26.

In correlation function determination unit 32, the delay which is determined by the shift register and clock in variable delay 26, is determined by averaging the time that the two signals are of like polarity. This is effected by the use of an exclusive OR gate. The exclusive OR gate receives the delayed and undelayed pulse waves and generates a high output signal when the two waves are equal and a low signal when they are unequal. An inverter connected to the exclusive OR gate inverts the exclusive OR gate output which is filtered by an RC filter that averages the instances of "equal" and "not equal" determinations. A correlation signal for every particular delay amount is therefore established.

To eliminate the problem of low level correlation which may occur due to characteristics of the noise signals themselves, a correlation function threshold 36 is provided for eliminating false readings.

A peak lock control 38 is provided which locks in on the maximum correlation signal. Peak lock control 38 is controlled to ignore low level correlation by the correlation function threshold circuit 36. Peak lock control 38 functions to control the operation of sweep voltage generator 40 as will be described in greater detail hereinunder.

Sweep voltage generator 40 generates a slow sawtooth voltage to control the frequency of the clock in the shift register of variable delay 26 over voltage control oscillator 34. This effects a search for the correlation signal peak when the circuit is not locked by the peak lock control 38. When the peak lock control 38 locates a correlation signal peak, the direction of variation of the sawtooth wave form of sweep voltage generator 40 is reversed to sweep back over the correlation signal peak. The rate of the sawtooth wave has two values, slow and fast. The slow value is used in tracking the main peak (when the peak is locked in) and the fast value is used to find the main peak quickly (to get over the correlation function threshold). The slow/fast feature is controlled by the correlation function threshold circuit.

Peak lock control 38 determines when the correlator or correlation function determination unit is moving away from the peak. That is when the correlation signal begins to decrease, this indicates a movement away from the correlation signal peak. Upon this occurrence, the peak lock controller issues a command to the sweep voltage generator to change the direction of the sweep. This reverses the direction of change of the delay amount and moves it back over the particular delay amount which corresponds to the correlation signal peak. The circuit is then in a locked state and travels back and forth over the correlation signal peak.

In greater detail, the peak lock control samples the correlation signal amplitude and stores this information. A short time later, the correlation signal is again sampled. The new sample and the stored sample are compared. If they are within a particular voltage, they are judged to be "equal". In this case, the second sampler is activated again. This continues until the second sample is either higher or lower than the original stored value. If the value of the latest sample is higher than the stored value, the cycle begins again with an updated stored value and later samples for comparison with it. If, however, the value of the latest sample is lower than the stored value, a judgment is made that the circuit is moving away from the correlation signal peak and a change-direction command is issued to the sweep voltage generator 40. The same command causes a digital read-out 42, to be updated.

The peak lock control circuit 38 is inoperative when the correlation function threshold criterion, as set by unit 36, is not satisfied.

Voltage control oscillator 34 includes an integrated circuit function generator and provides a swept frequency as a clock signal for the variable delay circuit 26. The frequency of this oscillator is controlled by the output of the sweep voltage generator 40.

A scaler factor or scaling means 44 is provided between the output of the voltage control oscillator, which provides a signal corresponding to the particular delay amount, and the digital readout 42. The scale factor operates as follows:

The delay D, provided by the shift register in unit 34 is:

$$D = N/fc \tag{1}$$

where N equals the number of stages in the register and fc is the frequency of the clock. The delay is related to the flow velocity, V, by:

$$D = X/V \tag{2}$$

where X is the sensor separation in the direction of flow. Combining these two expressions gives:

$$fc = (N/X)V \tag{3}$$

Thus, the flow velocity is directly related to the clock frequency. Counting the clock frequency, divided by the appropriate constant, K, gives a number equal to the velocity in the desired engineering units.

The digital readout 42 contains a counter which counts for ½ second. This means the number so determined equals ½ of the frequency of the signal at the input to the digital readout section:

$$\text{Output Number} = (fc/2) \tag{4}$$

Combining with equation (3) gives:

$$\text{Output Number} = (NV/2X) \tag{5}$$

Since N = 256:

$$\text{Output Number} = (256V/2X) \tag{6}$$

Getting the output to equal V requires dividing by a constant, K, to get the required calibration, giving:

$$\text{New Output Number} = (\text{Output Number}/K) = (256V/2XK)$$

Equality requires that the factor by unity in magnitude and supply the required units of velocity:

$$K = (256/2X) \quad (8)$$

Putting in units of length to X gives the same unit to velocity (feet, meters, etc).

The digital readout section counts the frequency at its input (the output of the scale factor section) and displays it to the user.

Details of the circuit blocks shown in FIG. 2 are shown in FIGS. 3A–3E.

Figure 3A:
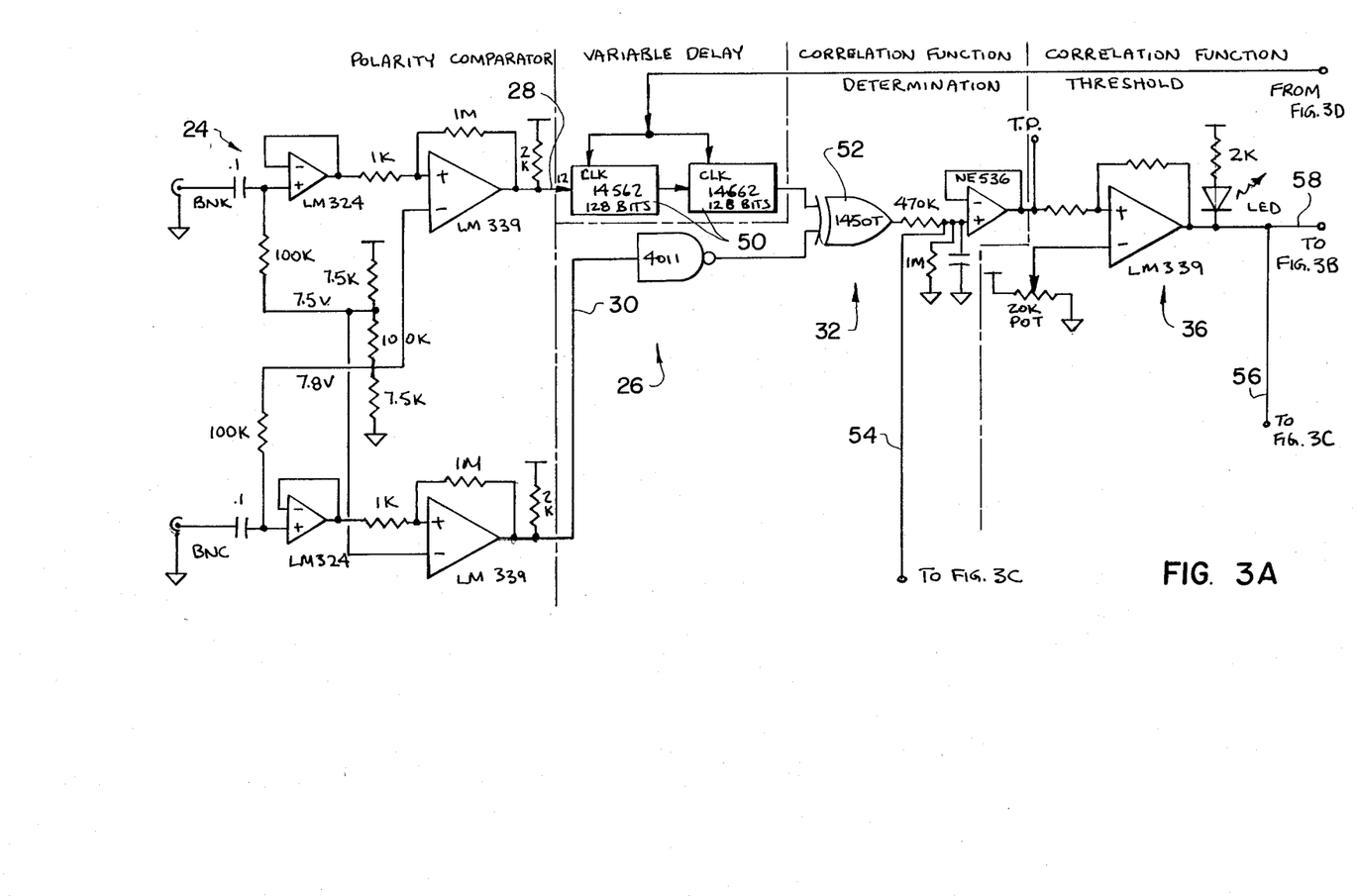
FIGS. 3A to 3E are schematic circuit diagrams of the various components of the dedicated correlator as shown in FIG. 2.

FIG. 3A shows the circuitry for the input polarity comparator 24, the variable delay 26, the correlation function determination unit 32 and the correlation function threshold 36. The pulse waves of noise signal A and B are provided over lines 28 and 30 respectively. The pulse wave on line 28 is delayed by an amount determined in clocking registers 50. The delayed and undelayed signals are provided to an exclusive OR gate 52 in correlation function determination section 32 which is averaged by following filter and averaging circuitry and provided over line 54 to the peak lock control shown in FIG. 3C. The correlation signal is also applied to the correlation function threshold which is connected over line 56 to the peak lock control 38. The signal of the correlation function threshold 36 is also applied over line 58, after inversion to the sweep voltage generator 40 shown in FIG. 3B.

Figure 3B:
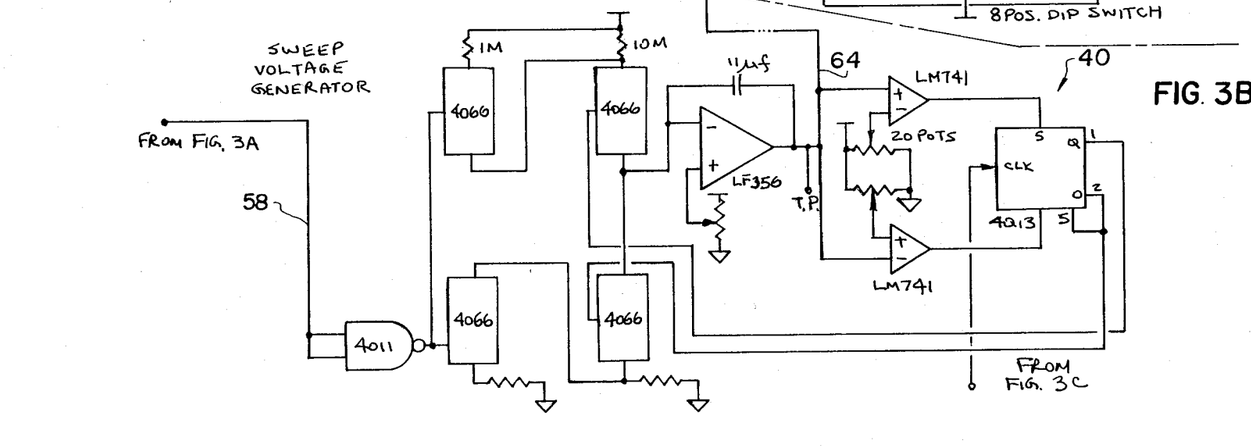

The slow/fast swept sawtooth is generated by the circuitry shown in FIG. 3B which illustrates the sweep voltage generator 40.

The threshold signal transmitted to the circuit of FIG. 3B from the circuit of FIG. 3A via line 58, is inverted by the 4011. This inverted threshold signal is then used to energize the first analog switches, (4066's) when the correlation signal is below the threshold. These switches connect 1 Megohm resistors across the 10 Megohm resistors that are in series with the second set of 4066 switch elements. The second set of 4066's are alternately energized (closed) to connect the upper or lower resistor combination to the input of the LF356 operational amplifier. This amplifier is connected in an integrator configuration, with the feedback capacitor of 11 microfarad and the alternately selected resistor combination controlling the integration. The two resistor combinations are connected to different voltage levels, typically one positive and the other negative (or to ground). Thus the LF356 circuit alternatively integrates up and down controlled by the switching of the resistor combinations. This gives a sawtooth of voltage, alternating positive and negative sloped periods in succession with each other.

The LM741's following the LF356 are connected as positive and negative level comparators. The upper one is connected so that its output goes positive when the input goes above the voltage determined by the pot setting. The lower one is connected so that its output goes high when its input is below the voltage determined by the pot on its input. The outputs of these LM741's are connected to opposite inputs of the 4013 flipflop and operate its set and reset inputs. When the voltage at the output of the LF356 reaches the high threshold, the upper LM741 actives the set input of the 4013. This causes the "Q" output to go high on the 4013 and turns on the upper 4066 switch element to connect the resistor network which is attached to the positive voltage. This causes the LF356 to begin a negative slope and integrate down. Similarly at the lower threshold, the lower LM741's output goes high and operates the reset input of the 4013, in turn causing the opposite set of input resistors and the negative voltage (or ground) to be selected. This causes the integrator to integrate upward. In this manner a sawtooth control voltage is generated.

The input to FIG. 3B from FIG. 3A is used to change the direction of the sawtooth whenever it goes high. This is connected to the clocking input of the 4013 causing it to change state when the clocking signal goes from low to high. This is used to effect the change in direction used in the tracking function of the correlator.

The sawtooth voltage at the output of the LF356 is used by vary the frequency of the voltage-controlled oscillator, constructed using an 8038 integrated circuit function generator. The output of the 8038 is then the clock signal to control the variable delay elements in FIG. 3A.

Figure 3C:
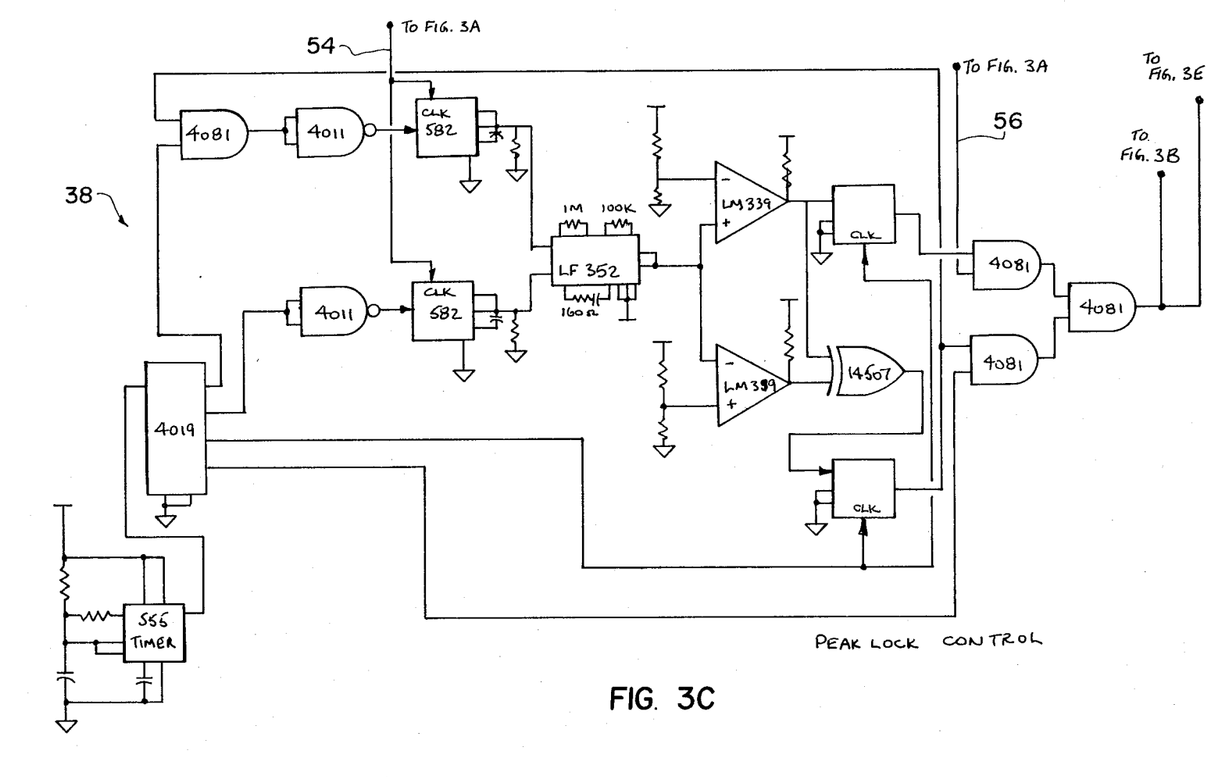

FIG. 3C shows the peak lock control 38. The 555 timer and a 4017 counter/divider (marked as a 4019 in the diagram in FIG. 3C) generates a sequence of signals to control the operation of the peak lock control. These are four individual signals generated. The first, in conjunction with a signal fed back from further into the circuit, controls a sample-and-hold stage (582) that takes a snapshot and remembers the correlation signal at the instant of the first control signal. The second control signal operates a second sample-and-hold stage (the lower 582) to remember the correlation signal at a slightly later point in time. The difference of these two samples is amplified by the LF352 instrumentation amplifier (a true difference amplifying integrated circuit). The amplified difference is presented to the two LM339 comparators. The upper LM339 is set to give high output when the difference is above a set value, determined by the resistive divider on its "−" input and the positive power supply. The lower LM339 similarly gives a high when the difference signal is below a second set value. These two set values are slightly different so that there is a small range where both comparators (LC339's) have a low value. This corresponds to the condition where the successive samples are equal (within a difference comparable to the noise level inherent on the signal).

When the two successive samples are not equal, the exclusive or circuit (14507) has a high output. This is clocked into a flipflop connected to the output of the 14507 by the action of the third of the control signals of the control signal sequence. The output of this flipflop is then the signal fed back (to the 4081 "and gate") mentioned earlier. When the two signals are not equal the fed back signal allows the first control signal to initiate a new sample by the upper 582. If the signals are equal the upper 582 holds its value until the lower one finds a value indicating that the correlation signal has changed.

The output of the upper comparator is clocked into the flipflop connected to its output by the action of this third control signal also. This signal is high when the sample taken by the second control signal is lower than the sample taken by the first control signal, indicating that the correlator is moving away from the peak. This is anded (by the three 4081 "and gate" integrated circuits) with the threshold signal, the exclusive or signal, and the fourth control signal and sent to the circuit in FIG. 3B to cause the control sawtooth to change direction when all of these are high.

Figure 3D:
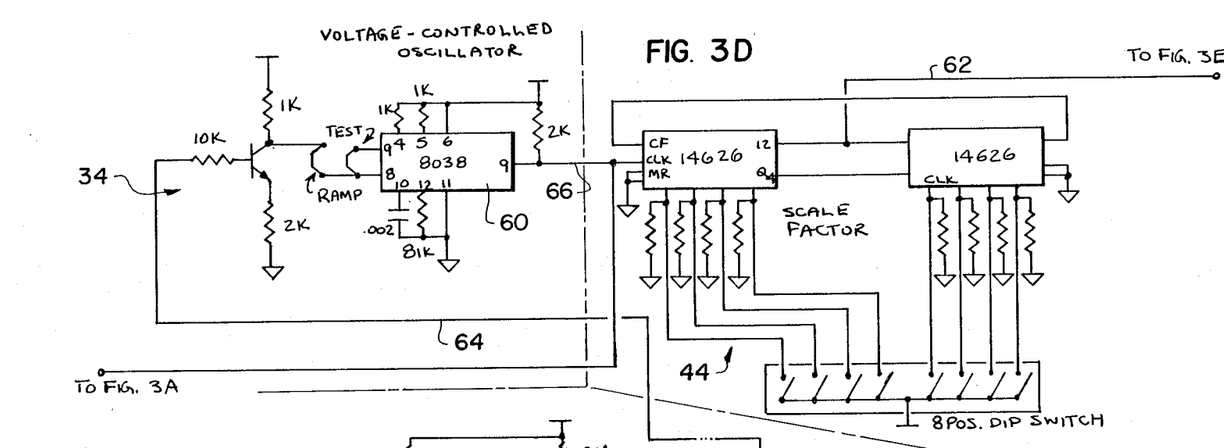
Figure 3E:
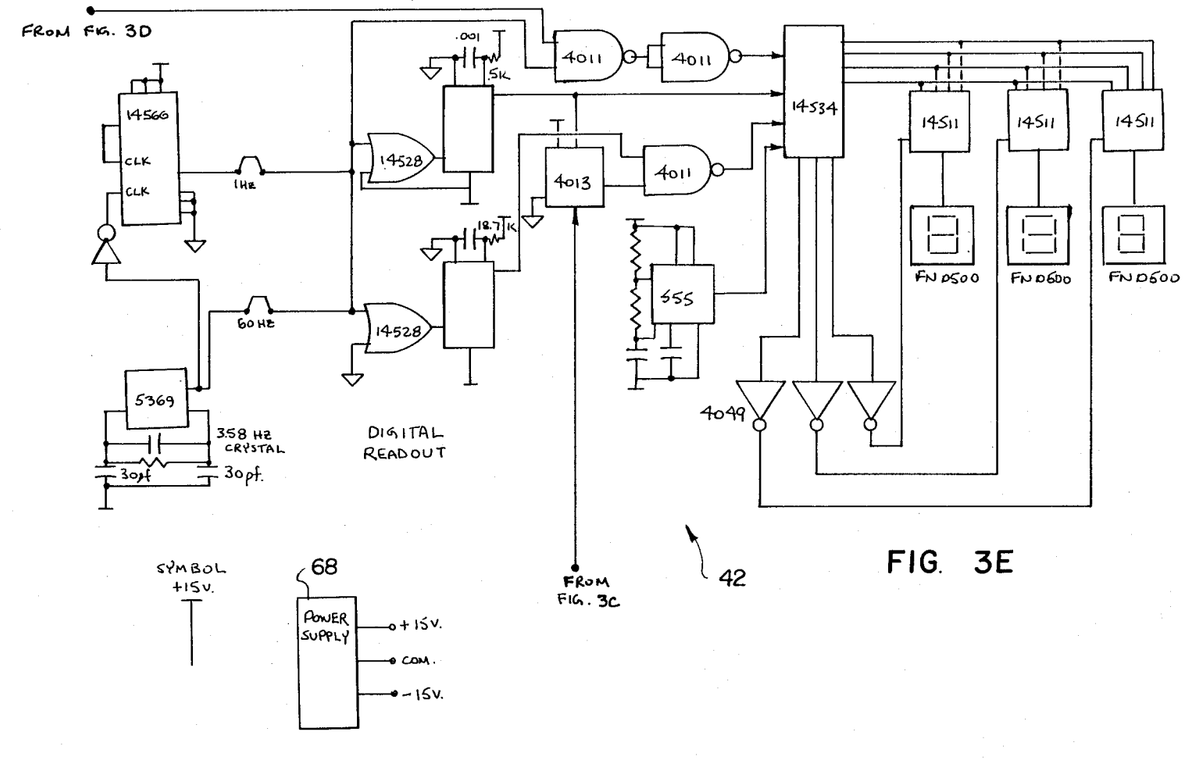

FIG. 3D provides the scale factor selection for the digital display shown in FIG. 3E. The 14626 integrated circuits are presettable counters that have a count-down controlled by the 8-position dip switch. The frequency of the voltage-controlled oscillator of FIG. 3B is connected to the first counter stage by line 66. Line 62 couples the output of the two counter stage to the circuitry of FIG. 3E.

FIG. 3E contains the counting stage, time base generator, display drivers and digital display. A 3.58 MHz crystal and a 5369 integrated circuit work together to generate a 60 Hz timing signal. This is connected to a 14566 counter which counts this down to provide a 1 Hz timing signal. One or the other of these may be selected to provide the desired scale factor range. The selected timing signal activates two one-shot multivibrators that provide narrow pulses to the 14534 counter circuit. The signal from the voltage-controlled-oscillator in FIG. 3D is anded with the 1 or 60 Hz timing signal and inputted to the counting input of the 14534 so that the 14534 counts during one-half of the period of the 1 or 60 Hz timing signal. At the beginning of this period for counting, the 14534 is reset by the action of the upper one-shot circuit.

The signal from FIG. 3C is used to set the 4013, and one of the one-shot circuits is used to reset it. When a desired counting period starts, the 4013 is reset. It is set by the "change direction" signal from FIG. 3C. The output of the 4013 is connected to one of the output enables of the 14534. This disables the display when the correlation circuit isn't locked onto a peak, as peak-lock is indicated by repeated signals for the slow sweep circuit to change direction.

The 555 timer generates a scan clock for the display outputs of the 14534. The digital displays are connected to the output of the 14534.

While specific embodiments of the invention have been shown and described in detail to illustrate the application of the principles of the invention, it will be understood that the invention may be embodied otherwise without departing from such principles.

What is claimed is:

1. A correlator for establishing correlation of two noise signals having positive and negative polarity components comprising:

an input polarity comparator for each signal, for generating a pulse wave for each signal having a high level upon the occurrence of one of the positive and negative polarity components and a low level upon the occurrence of the other of the positive and negative polarity components;

variable delay means connected for receiving one of the pulse waves and delaying that one of the pulse waves by a variable delay amount;

wave correlation means for receiving the other of the pulse waves and the delayed one of the pulse waves and generating a correlation signal which is high with correlation between the delayed and other pulse waves and low with low correlation thereof;

sweep means connected to said variable delay means for varying the delay amount in an increasing and decreasing direction;

peak lock means connected to said sweep means and to said wave correlation means for determining whether the correlation signal is increasing or decreasing and with a decreasing correlation signal, controlling said sweep means to change the direction of variation thereof so that a particular delay amount corresponding to a maximum correlation signal is obtained;

scaling means connected to said sweep means for receiving the particular delay amount and generating a readable signal therefrom; and a correlation signal threshold means connected between said wave correlation means and peak lock means for permitting operation of said peak lock means only when said correlation signal rises above a selected level.

2. A correlator according to claim 1, including first and second spaced-apart sensors adapted to be mounted along a flow path of a fluid, for generating said two noise signals.

3. A correlator according to claim 2, wherein said sensors comprise electrostatic charge pattern sensors for sensing variations in electrostatic charge in the flow.

4. A correlator according to claim 2, wherein said sensors comprise a photodetector and a light for reflecting light off the flow and to the photodetector for generating each of the two noise signals.

5. A correlator according to claim 2, wherein said scaling means comprises a circuit for converting the particular delay amount to a velocity amount representing the velocity of flow between said sensors.

6. A correlator according to claim 1, wherein said input polarity comparator includes means for generating a square wave corresponding to each of said two noise signals, said square waves having a high level upon the occurrence of a positive polarity component and a low level upon the occurrence of a negative polarity component, each square wave corresponding to a respective one of said pulse waves.

7. A correlator according to claim 1, wherein said sweep means has two speeds, a fast speed for fast increasing and decreasing variations in said delay amount before a maximum correlation signal is determined by said peak lock means, and a slow speed after said peak lock means has determined said maximum correlation signal.

8. A correlator for establishing correlation of two noise signals having positive and negative polarity components comprising:

an input polarity comparator for each signal, for generating a pulse wave for each signal having a high level upon the occurrence of one of the positive and negative polarity components and a low level upon the occurrence of the other of the positive and negative polarity components;

variable delay means connected for receiving one of the pulse waves and delaying that one of the pulse waves by a variable delay amount;

wave correlation means for receiving the other of the pulse waves and the delayed one of the pulse waves and generating a correlation signal which is high with correlation between the delayed and other pulse waves and low with low correlation thereof;

sweep means connected to said variable delay means for varying the delay amount in an increasing and decreasing direction;

wherein said sweep means comprises a sweep voltage generator for generating a sawtooth wave with increasing and decreasing sides and a voltage controlled oscillator connected to said sweep voltage generator for increasing and decreasing a frequency according to said sawtooth wave sides, said voltage control oscillator connected to said variable delay means for varying the delay amount according to variations in the frequency of said voltage control oscillator;

peak lock means connected to said sweep means and to said wave correlation means for determining whether the correlation signal is increasing or decreasing and with a decreasing correlation signal, controlling said sweep means to change the direction of variation thereof so that a particular delay amount corresponding to a maximum correlation signal is obtained;

scaling means connected to said sweep means for receiving the particular delay amount and generating a readable signal therefrom; and a correlation signal threshold means connected between said wave correlation means and peak lock means for permitting operation of said peak lock means only when said correlation signal rises above a selected level.

9. A correlator according to claim 8, wherein said wave correlation means includes an exclusive OR gate for receiving the delayed and other pulse wave and generating a high output upon correlation therebetween and a low output upon lack of correlation therebetween, and averaging means connected to said exclusive OR gate for averaging the instances of correlation and non-correlation to generate said correlation signal.

10. A correlator according to claim 9, including a digital readout connected to said scaling means for converting said readable signal into a digital display.

11. A correlator for establishing correlation of two noise signals having positive and negative polarity components comprising:

an input polarity comparator for each signal, for generating a pulse wave for each signal having a high level upon the occurrence of one of the positive and negative polarity components and a low level upon the occurrence of the other of the positive and negative polarity components;

variable delay means connected for receiving one of the pulse waves and delaying that one of the pulse waves by a variable delay amount;

wave correlation means for receiving the other of the pulse waves and the delayed one of the pulse waves and generating a correlation signal which is high with correlation between the delayed and other pulse waves and low with low correlation thereof;

sweep means connected to said variable delay means for varying the delay amount in an increasing and decreasing direction;

peak lock means connected to said sweep means and to said wave correlation means for determining whether the correlation signal is increasing or decreasing and with a decreasing correlation signal, controlling said sweep means to change the direction of variation thereof so that a particular delay amount corresponding to a maximum correlation signal is obtained;

scaling means connected to said sweep means for receiving the particular delay amount and generating a readable signal therefrom; and wherein said variable delay means comprises a digital shift register having a plurality of positions corresponding to a number of delay amounts, said sweep means comprising a sweep voltage generator and a voltage control oscillator connected to said sweep voltage generator, said sweep voltage generator operable to generate a sawtooth wave having increasing and decreasing sides and said voltage controlled oscillator operable to increase and decrease a frequency according to said sawtooth wave sides, said voltage controlled oscillator connected to said digital shift register for changing the position thereof according to changes in the voltage controlled oscillator frequency.

12. A method of determining fluid flow in a conduit by correlating two separated noise signals each having positive and negative polarity components comprising:

generating a square wave having a high level upon the occurrence of each positive polarity component for each of said two noise signals;

variably delaying one of said square waves with respect to the other;

comparing said delayed and undelayed square waves for determining correlation thereof;

generating a correlation signal which is high with high correlation of said delayed and undelayed square waves and low with low correlation of said delayed and undelayed signals; and using said generated correlation signal to provide a feedback signal varying the delay of said delayed square wave and to provide a pulse train signal whose frequency is indicative of the fluid flow in the conduit.

* * * * *